(12) United States Patent
Chang

(10) Patent No.: US 9,499,228 B2
(45) Date of Patent: Nov. 22, 2016

(54) SELF-BALANCING VEHICLE FRAME

(71) Applicant: Fu-Long Chang, Chiayi (TW)

(72) Inventor: Fu-Long Chang, Chiayi (TW)

( * ) Notice: Subject to any disclaimer, the term of this patent is extended or adjusted under 35 U.S.C. 154(b) by 0 days.

(21) Appl. No.: 14/542,134

(22) Filed: Nov. 14, 2014

(65) Prior Publication Data

US 2015/0353158 A1 Dec. 10, 2015

(30) Foreign Application Priority Data

Jun. 10, 2014 (CN) .......................... 2014 1 0260138

(51) Int. Cl.
*B62D 61/00* (2006.01)
*B62K 3/00* (2006.01)
*B62K 5/01* (2013.01)

(52) U.S. Cl.
CPC ............... *B62K 3/007* (2013.01); *B62K 3/002* (2013.01); *B62K 5/01* (2013.01)

(58) Field of Classification Search
CPC ..................................................... B62K 3/007
USPC ......... 180/218, 7.1, 65.51, 21, 65.1
See application file for complete search history.

(56) References Cited

U.S. PATENT DOCUMENTS

| 7,363,993 | B2* | 4/2008 | Ishii | A63C 17/08 180/218 |
|---|---|---|---|---|
| 8,028,777 | B2* | 10/2011 | Kakinuma | A63C 17/08 180/218 |
| 8,225,891 | B2* | 7/2012 | Takenaka | B62K 3/007 180/7.1 |
| 2011/0303475 | A1* | 12/2011 | Kim | B62K 3/007 180/218 |
| 2012/0166048 | A1* | 6/2012 | Inoue | B62K 3/007 701/49 |
| 2013/0238231 | A1* | 9/2013 | Chen | B62K 3/007 701/124 |

* cited by examiner

*Primary Examiner* — Tony H. Winner
(74) *Attorney, Agent, or Firm* — Muncy, Geissler, Olds & Lowe, P.C.

(57) ABSTRACT

A self-balancing vehicle frame includes two side frame units and a bearing unit interconnecting the side frame units such that each of the side frame units can tilt independently against the other of the side frame units. Each of side frames is mounted with a wheel, a driver, and a self-balancing electric system integrated with a pedal and handle. Through operation of hands and feet, each of the side frame units is operable to tilt the corresponding components forwardly and rearwardly. As such, a user can operate the vehicle using hands and/or feet to control travelling and turning of the vehicle.

12 Claims, 17 Drawing Sheets

SELF-BALANCING VEHICLE FRAME

CROSS-REFERENCE TO RELATED APPLICATION

This application claims priority of Chinese Application No. 201410260138.5, filed on Jun. 10, 2014.

BACKGROUND OF THE INVENTION

1. Field of the Invention

This invention relates to a vehicle frame, and more particularly to a self-balancing vehicle frame.

2. Description of the Related Art

Currently, a single-wheeled or two-wheeled self-balancing vehicle is a popular vehicle, and includes a built-in self-balancing electric system that uses a gyro, angle sensors, or a similar device to detect forward or rearward tilt of the vehicle to thereby drive automatically rotation of the wheels to compensate tilt of the vehicle, in such a manner that the vehicle is maintained in a balanced state. During use of a single-wheeled self-balancing vehicle, since there is only one touchdown point, the balance along the direction of the axle must be controlled by adjusting the pose through the user. As a result, the single-wheeled self-balancing vehicle is difficult to balance and control. Although a two-wheel self-balancing vehicle can overcome the shortcomings said above, it includes one standing platform and a middle handle that is set to move or turn the vehicle, so that the user must use the hands and feet to operate the vehicle simultaneously.

Moreover, during turning of the two-wheeled self-balancing vehicle, since the body of the user is thrown outwardly by virtue of centrifugal force, in order to keep standing stable, an excessive pulling force is bound to be applied by the user to the middle handle. Hence, unexpected excessive turning magnitude results in overturning of the vehicle. As such, to ensure safety during turning of the vehicle, it is necessary to carefully hold and control the middle handle. Furthermore, due to obstruction of the middle handle, it is difficult for the user to jump away through the front of the vehicle, thereby resulting in potential danger during use.

SUMMARY OF THE INVENTION

The object of this invention is to provide a safety self-balancing vehicle frame that is convenient to operate.

According to an aspect of this invention, there is provided a self-balancing vehicle frame that facilitates to adapt to two pedals, two handles, two wheels and two self-balancing electrical systems for automatically controlling rotation of the wheels to maintain the vehicle in a balanced state, the self-balancing vehicle frame comprising:

two side frame units, each of the side frame units being adapted to be mounted with a respective wheel and a respective self-balancing electrical system integrated with the pedals allowing the user to stand to tilt forwardly and rearwardly thus driving synchronously forward and rearward tilt of the respective one self-balancing electrical system to activate rotation of the respective one wheel; and a bearing unit, before being assembled into a complete vehicle and while being under a subassembly condition, interconnecting and located between the side frame units such that each of the side frame units can tilt independently against the other of the side frame units; and after said bearing unit is assembled into a complete self balancing vehicle and in working status, the rotating axis of the bearing unit being set around the rotating axis of the wheels with an eccentricity.

According to another aspect of this invention, there is provided a self-balancing vehicle frame adapted for a self-balancing vehicle, facilitating to be mounted with two wheels and two self-balancing electrical systems for controlling rotation of the wheels to maintain the vehicle in a balanced state, the self-balancing vehicle frame comprising:

two side frame units, each of the side frame units being adapted to be mounted with a respective one of the self-balancing electrical systems and being operable to tilt forwardly and rearwardly for driving synchronously forward and rearward tilt of the respective one of the self-balancing electrical systems to turn the respective one of the wheels;

a connecting frame unit having two end portions aligned respectively with the side frame units and adapted to be mounted with the wheels, respectively; and two bearing units connected to said connecting frame unit and the side frame units such that each of the side frame units can tilt independently against the other of the side frame units before being assembled into a complete vehicle.

As such, a user can operate the vehicle using hands and/or feet to control travelling and turning of the vehicle.

BRIEF DESCRIPTION OF THE DRAWINGS

These and other features and advantages of this invention will become apparent in the following detailed description of the embodiments of this invention, with reference to the accompanying drawings, in which.

DETAILED DESCRIPTION OF THE EMBODIMENTS

Figure 1:
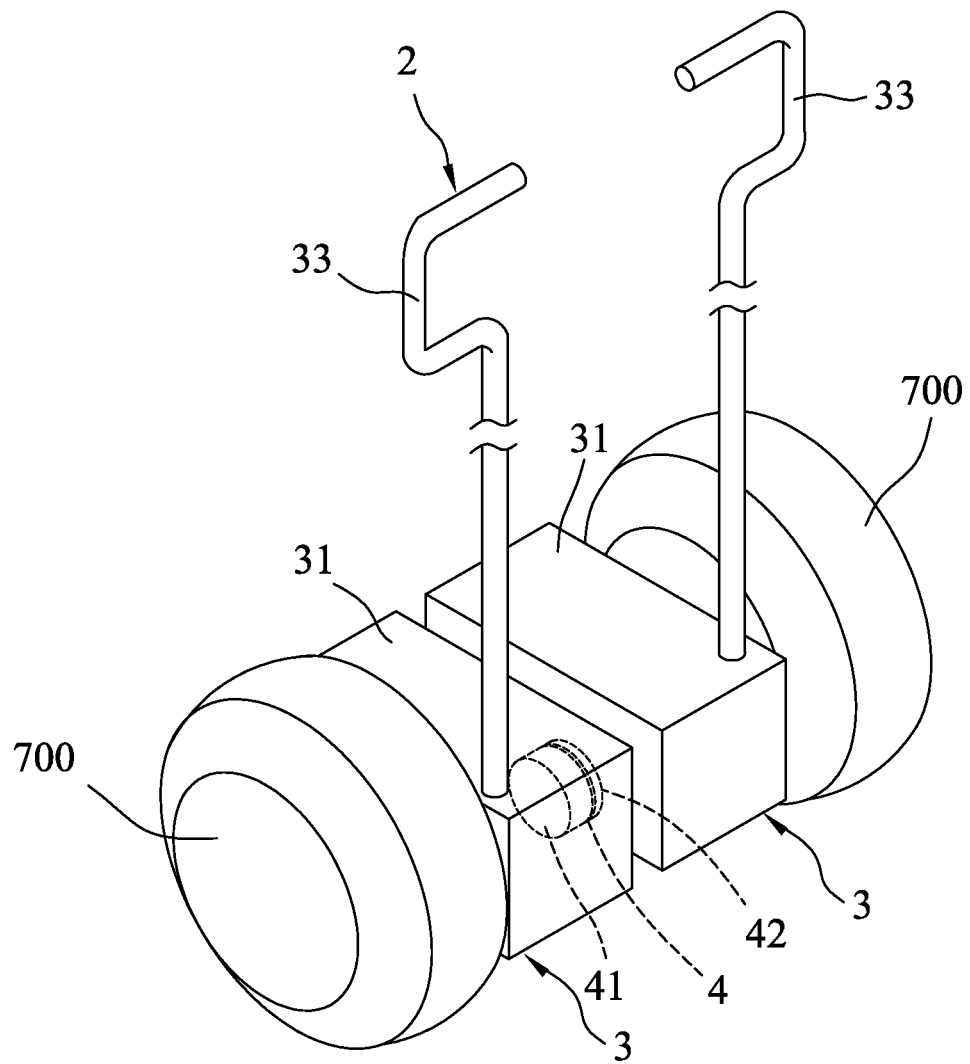
FIG. 1 is a perspective view of the first embodiment of a self-balancing vehicle frame according to this invention.

Before the present invention is described in greater detail in connection with the embodiments, it should be noted that similar elements and structures are designated by like reference numerals throughout the entire disclosure.

Figure 2:
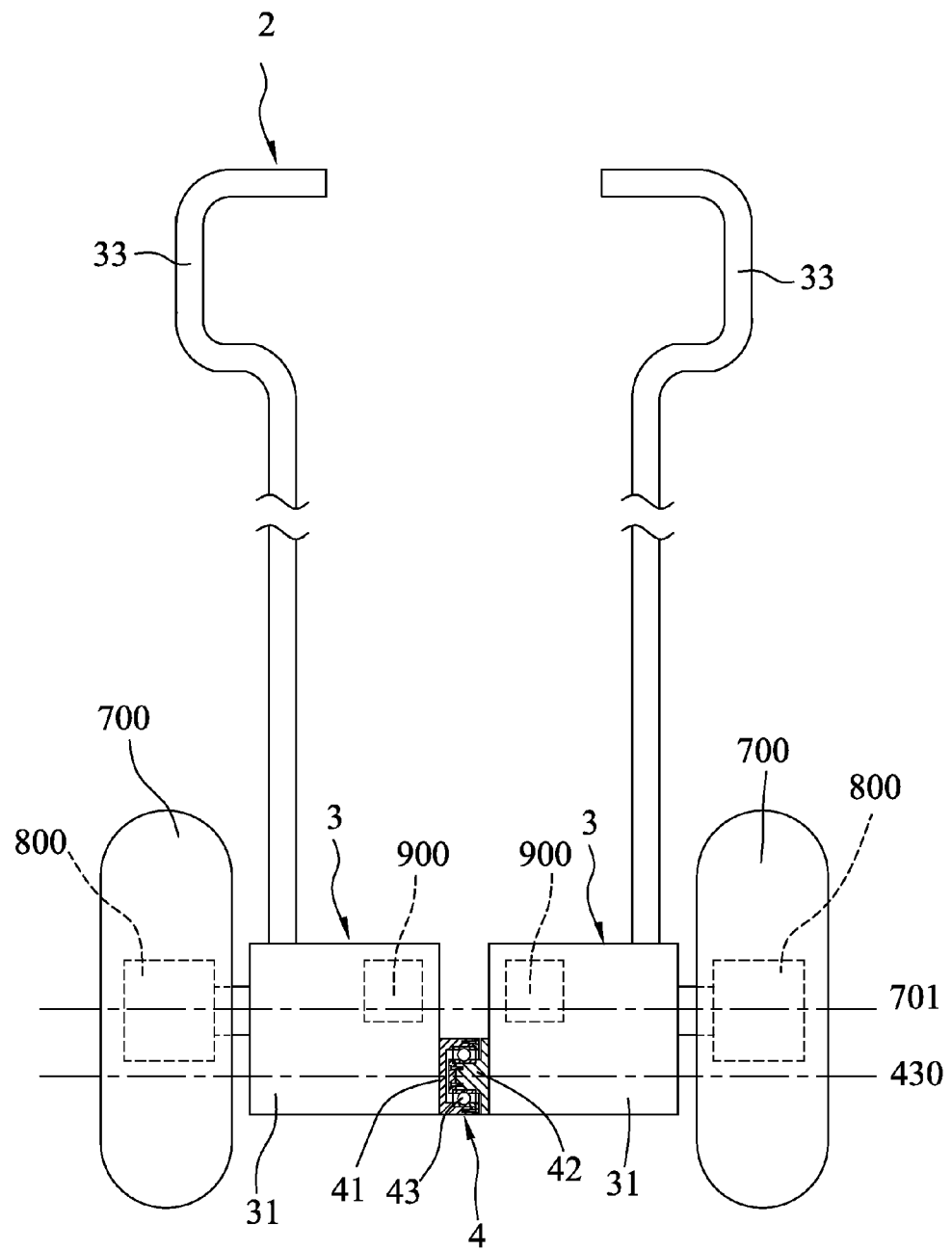
FIG. 2 is a front view of the first embodiment.
Figure 3:
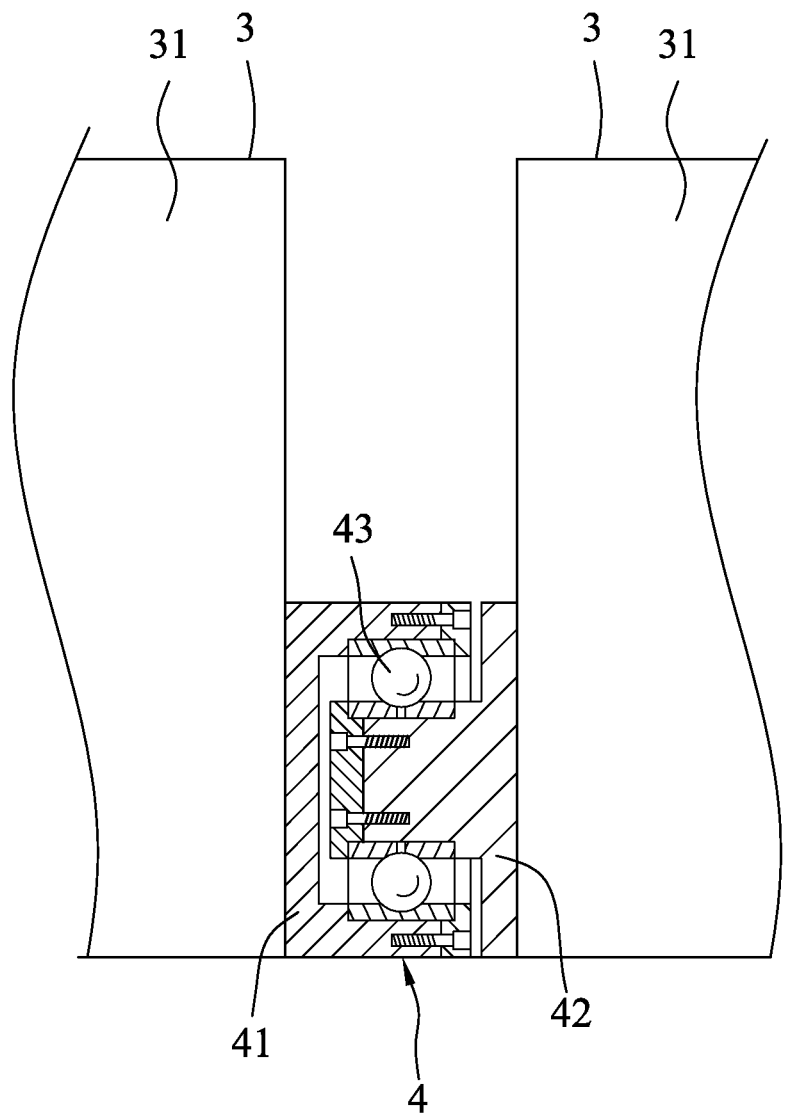
FIG. 3 is a fragmentary schematic sectional view of the first preferred embodiment.

Referring to FIGS. 1, 2, and 3, the first embodiment of a self-balancing vehicle frame 2 according to this invention is adapted to be mounted with two wheels 700, two drivers 800 for driving respectively the wheels 700, and two self-balancing electrical systems 900 for controlling respectively the drivers 800. In this embodiment, each driver 800 is an electrical motor disposed inside the corresponding wheel 700. Such an electrical motor wheel is used widely on an electric motorcycle. Each self-balancing electrical system 900 includes a gyro (not shown) and/or an angle sensor (not shown) for measuring angular displacement, as well as a control circuit (not shown) for controlling operation of the corresponding driver 800 such that, when the corresponding driver 800 is tilted forwardly or rearwardly, it is commanded to drive the corresponding wheel 700 to rotate in a corresponding direction, so as to maintain the vehicle frame 2 in a balanced state in a known manner.

The vehicle frame 2 includes two side frame units 3 spaced apart from each other along a left-to-right direction and each adapted for mounting the corresponding wheel 700, the corresponding driver 800, and the corresponding self-balancing electrical system 900, and a bearing unit 4 connected between the side frame units 3 such that each side frame unit 3, before being assembled into a complete vehicle and while being under subassembly condition, can tilt independently against the other of the side frame unit 3; and after said bearing unit 4 is assembled into a complete self balancing vehicle as shown in FIGS. 1, 2 and its center axis 430 is set below the rotating axis of wheels 701 with an appropriate eccentricity, while the vehicle in using and user being operating a stop-mode in perfect freezing balanced state, in this right moment, the electrical balancing function is instantly activated, halting the wheels in exact positions to keep co-plane of 701 and 430 perpendicular to earth, side frame units 3 steadily hanging down on 701 axis like a cradle and no excessive torque or horizontal force acting on side frame units 3, and after then, no matter how small a force or torque happens to try to tilt any one of side frames 3 is bound to be blended and interacted in terms of action and reaction and exchanged between two side frames 3 and by taking 701 as a pivoting point and said eccentricity as torque arm through aid of bearing unit 4, thus, two side frames 3 as above configuration is bound to be working dependently and interactively and collaborated with each other, not independently.

Each side frame unit 3 is configured as a hollow box, and has a pedal portion 31 supporting a foot of the user and mounted with the corresponding wheel 700 associated with the corresponding driver 800 and, in its hollow box body, the corresponding self-balancing electrical system 900, and a handle portion 33 connected fixedly to and extending upwardly from the pedal portion 31. The pedal portions 31 associated with the side frame units 3 are disposed between the wheels 700. The rotating axis 701 of the wheels 700 is parallel to and below the central axis 430 of the bearing unit 4 with an appropriate eccentricity.

The pedal portions 31 can be driven by feet of the user to tilt forwardly and rearwardly about the rotating axis of the wheels 701 to drive forward and rearward tilt of the self-balancing electrical systems 900. The handle portions 33 of the side frame units 3 can be pushed forwardly or pulled rearwardly to drive forward and rearward tilt of the pedal portions 31 and, thus, the self-balancing electrical systems 900.

The bearing unit 4 includes a first pivot seat 41 and a second pivot seat 42 that are connected respectively and firmly to side surfaces of the pedal portions 31 that face toward each other, and a bearing 43 connected between the first and second pivot seats 41, 42 such that the first and second pivot seats 41, 42 can rotate relative to each other before being assembled into a complete vehicle.

During use, the user steps on the pedal portions 31 using the feet, and holds the handle portions 33 using the hands.

Figure 4:
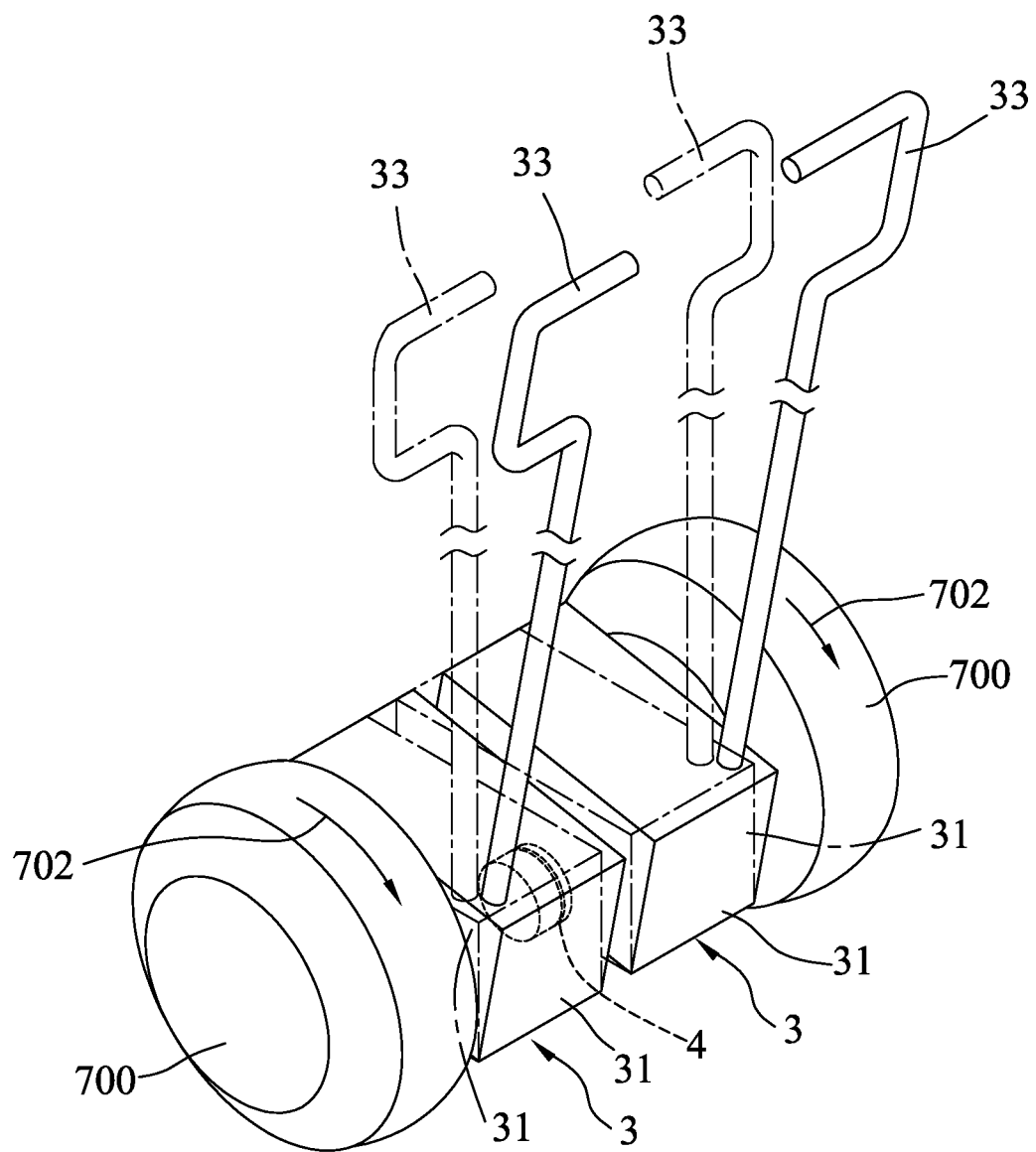
FIG. 4 is a view similar to FIG. 1 but illustrating forward tilt of the two side frame units.

With particular to FIGS. 2 and 4, the vehicle can be moved forwardly by pushing the handle portions 33 forwardly with the hands and/or tilting the pedal portions 31 forwardly with the feet. When the handle portions 33 are pushed forwardly, or when the pedal portions 31 are tilted forwardly, the self-balancing electrical systems 900 are also tilted forwardly to drive synchronous rotation of the wheels 700 in a positive direction 702, thereby moving the vehicle forwardly and maintaining the vehicle in a balanced state.

Figure 5:
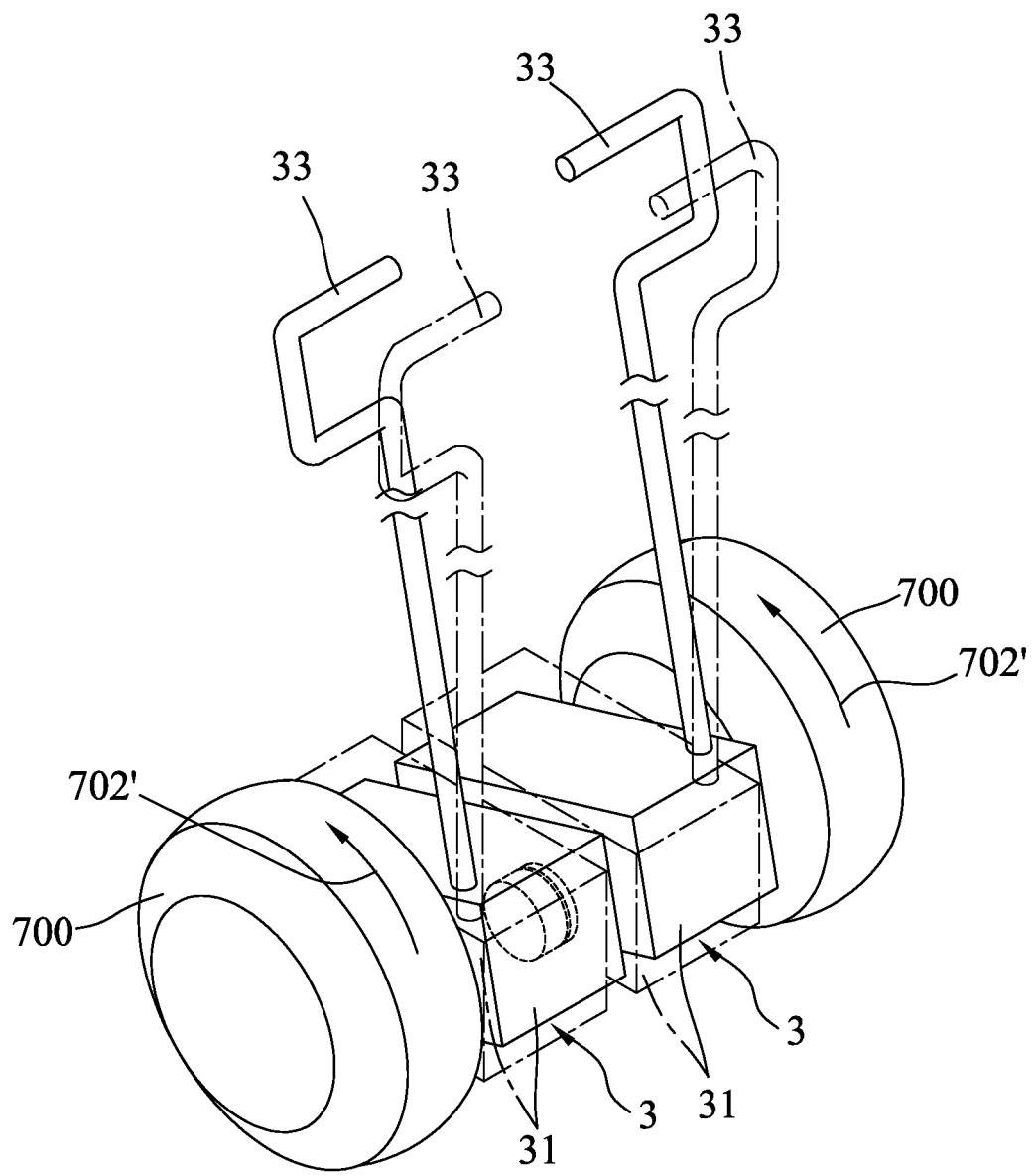
FIG. 5 is a view similar to FIG. 1 but illustrating rearward tilt of the two side frame units.

With particular to FIGS. 2 and 5, the vehicle can be moved rearwardly by pulling the handle portions 33 rearwardly with the hands and/or tilting the pedal portions 31 rearwardly with the feet. When the handle portions 33 are pushed rearwardly, or when the pedal portions 31 are tilted rearwardly, the self-balancing electrical systems 900 are also tilted rearwardly to drive synchronous rotation of the wheels 700 in a reverse direction 702' opposite to the positive direction 702 (see FIG. 4), thereby moving the vehicle rearwardly and maintaining the vehicle in a balanced state.

To stop the vehicle, the handle portions 33 need to be rotated back to vertical positions so as to allow the self-balancing electrical systems 900 to control the drivers 900 to stop the wheels 700.

Figure 6:
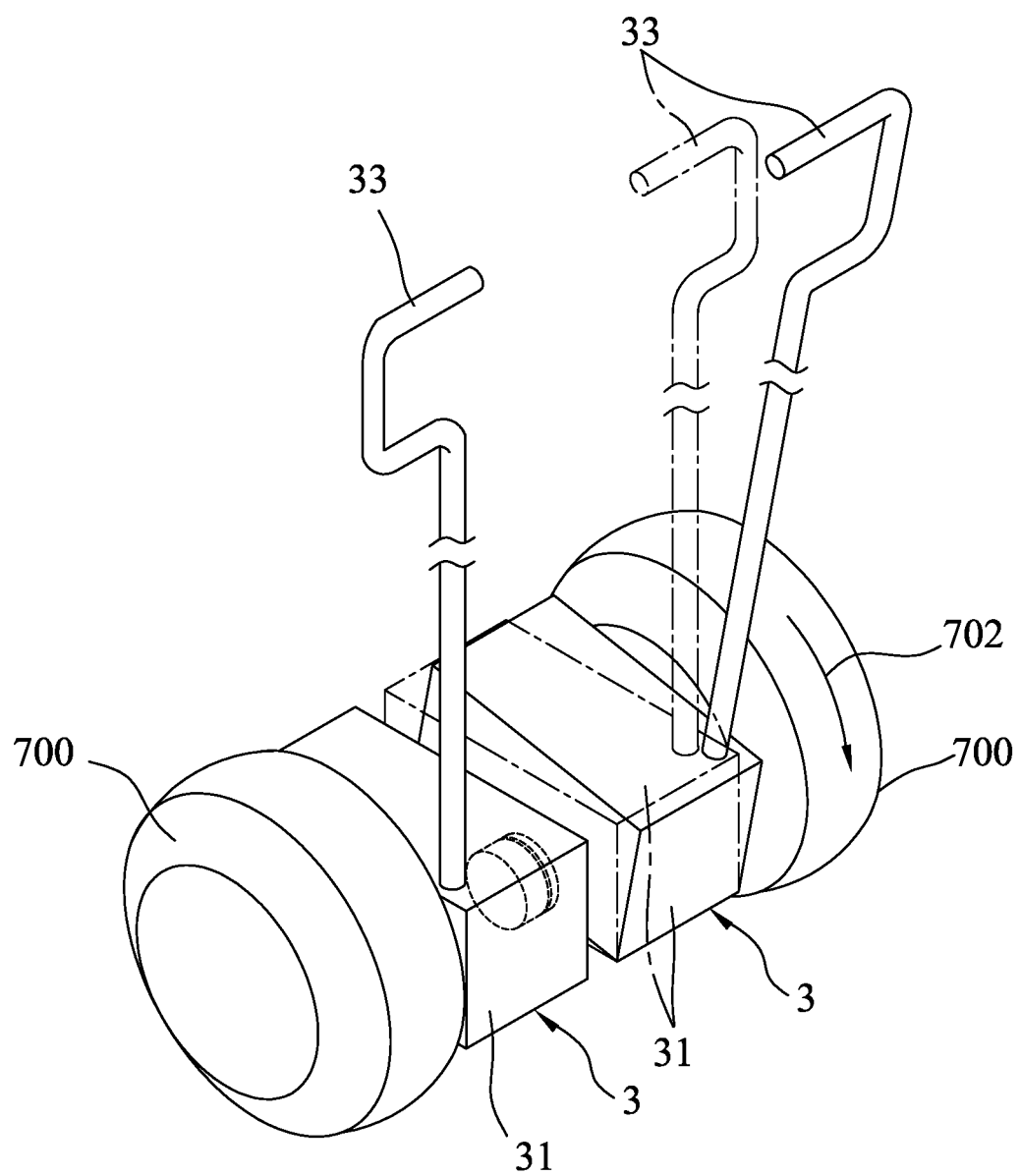
FIG. 6 is a view similar to FIG. 1 but illustrating forward tilt of the right side frame unit.
Figure 7:
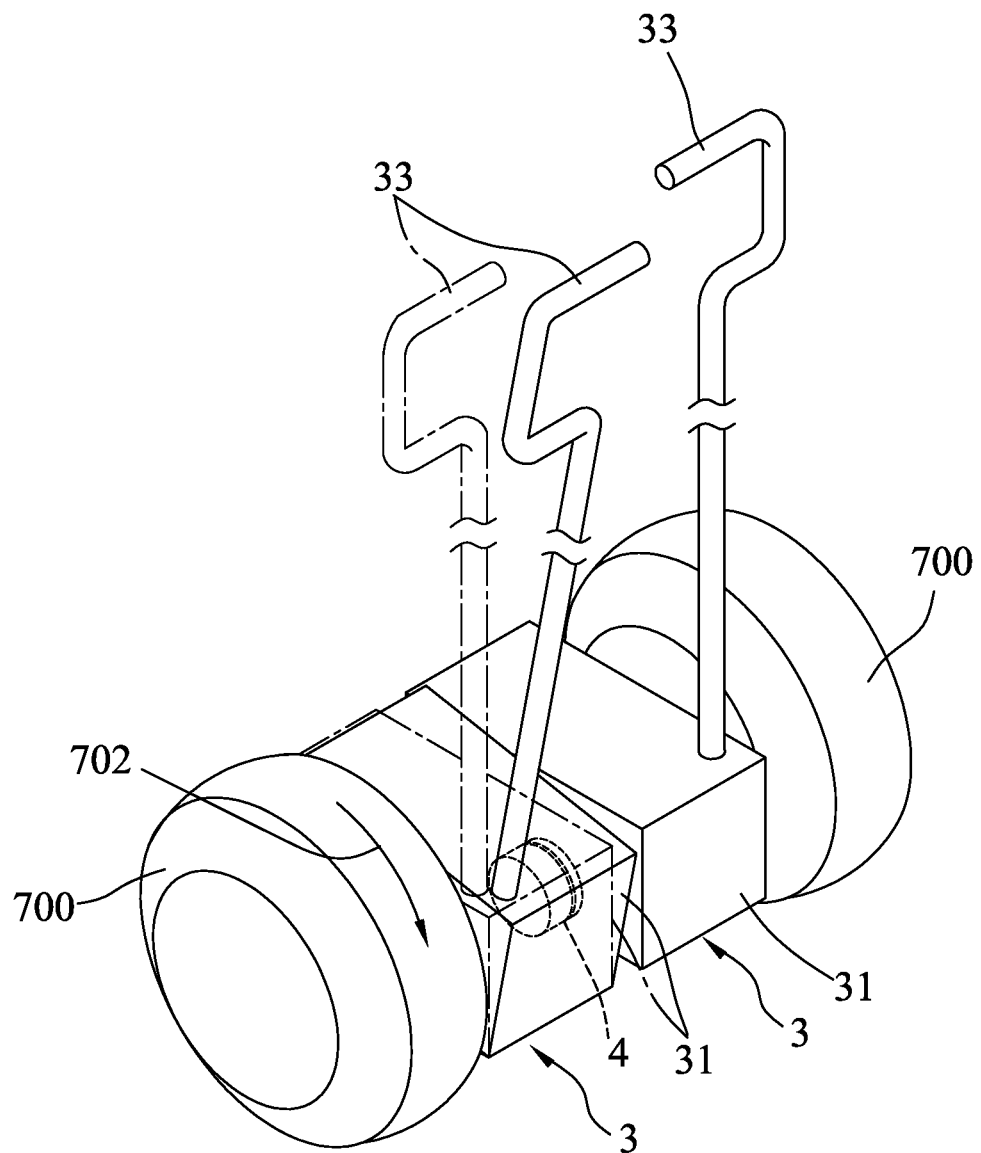
FIG. 7 is a view similar to FIG. 1 but illustrating forward tilt of the left side frame unit.

With particular reference to FIGS. 2, 6, and 7, when it is desired to move the vehicle forwardly and turn the vehicle rightwardly, it is only necessary to apply a force to the left handle portion 33 or the left pedal portion 31 to tilt the left handle portion 33 and the left pedal portion 31 forwardly. Hence, the left self-balancing electrical system 900 is tilted forwardly to control the left wheel 700 to rotate in the positive direction 702. Similarly, when it is desired to move the vehicle forwardly and turn the vehicle leftwardly, it is only necessary to apply a force to the right handle portion 33 or the right pedal portion 31 to tilt the right handle portion 33 and the right pedal portion 31 forwardly. Hence, the right self-balancing electrical system 900 is tilted forwardly to control the right wheel 700 to rotate in the positive direction 702. Conversely, when it is desired to move the vehicle rearwardly and turn the vehicle rightwardly, it is only necessary to apply a force to tilt the left side frame unit 3 rearwardly. Hence, the left self-balancing electrical system 900 is tilted rearwardly to control the left wheel 700 to rotate in the reverse direction 702'. Similarly, when it is desired to move the vehicle rearwardly and turn the vehicle leftwardly, it is only necessary to apply a force to tilt the right side frame unit 3 rearwardly. Hence, the right self-balancing electrical system 900 is tilted rearwardly to control the right wheel 700 to rotate in the reverse direction 702'. As such, the vehicle can be turned by operating one of the side frame units 3.

Alternatively, the vehicle may be turned by operating both of the side frame units 3. To be more specific, the vehicle can be turned by tilting one of the side frame units 3 forwardly and tilting the other of the side frame units 3 rearwardly.

Through operation of the pedal portions 31 and the handle portions 33, the self-balancing electrical systems 900 can be tilted forwardly and rearwardly so that the vehicle can be controlled conveniently using the hands or feet of the user, thereby facilitating control of the vehicle. Furthermore, if the vehicle is out of control, the user can jump away from the vehicle through a space between the handle portions 33, so as to promote safety during use. Although the handle portions 33 is provided in this embodiment, they may be omitted so that the vehicle is controlled by operating only the pedal portions 31.

In this embodiment, the first and second pivot seats 41, 42 of the bearing unit 4 are connected respectively and fixedly to the side frame units 3 for purposes of replacement. However, in actual practice, the first and second pivot seats 41, 42 may be formed respectively and integrally on the side frame units 3 for convenience of manufacture and assembly. The bearing 43 may be replaced with any other suitable member as long as relative rotation of the first and second pivot seats 41, 42 is allowed. Or, the bearing unit 4 may be replaced with any other suitable member as long as relative rotation of the pedal portions 31 is allowed.

It should be noted that, in this embodiment, the self-balancing electrical systems 900 have the functions of detecting angular displacement and controlling operation of the drivers 800, and can be driven by the side frame units 3 to control the drivers 800. Alternatively, the self-balancing electrical systems 900 only have the function of detecting angular displacement, and a control circuit for controlling the drivers 800 can be mounted to one of the side frame units 3.

Figure 8:
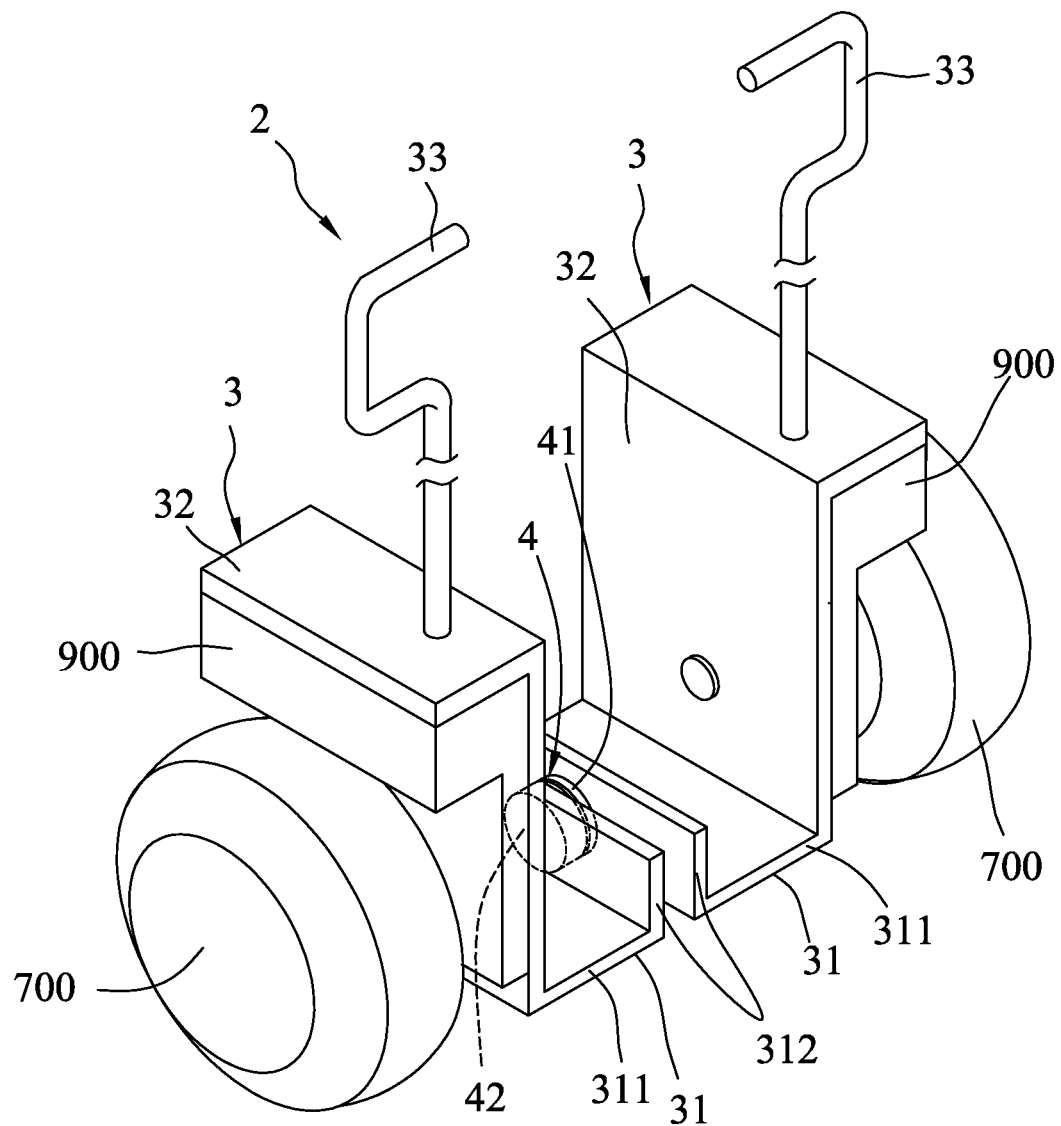
FIG. 8 is a perspective view of the second embodiment of a self-balancing vehicle frame according to this invention.
Figure 9:
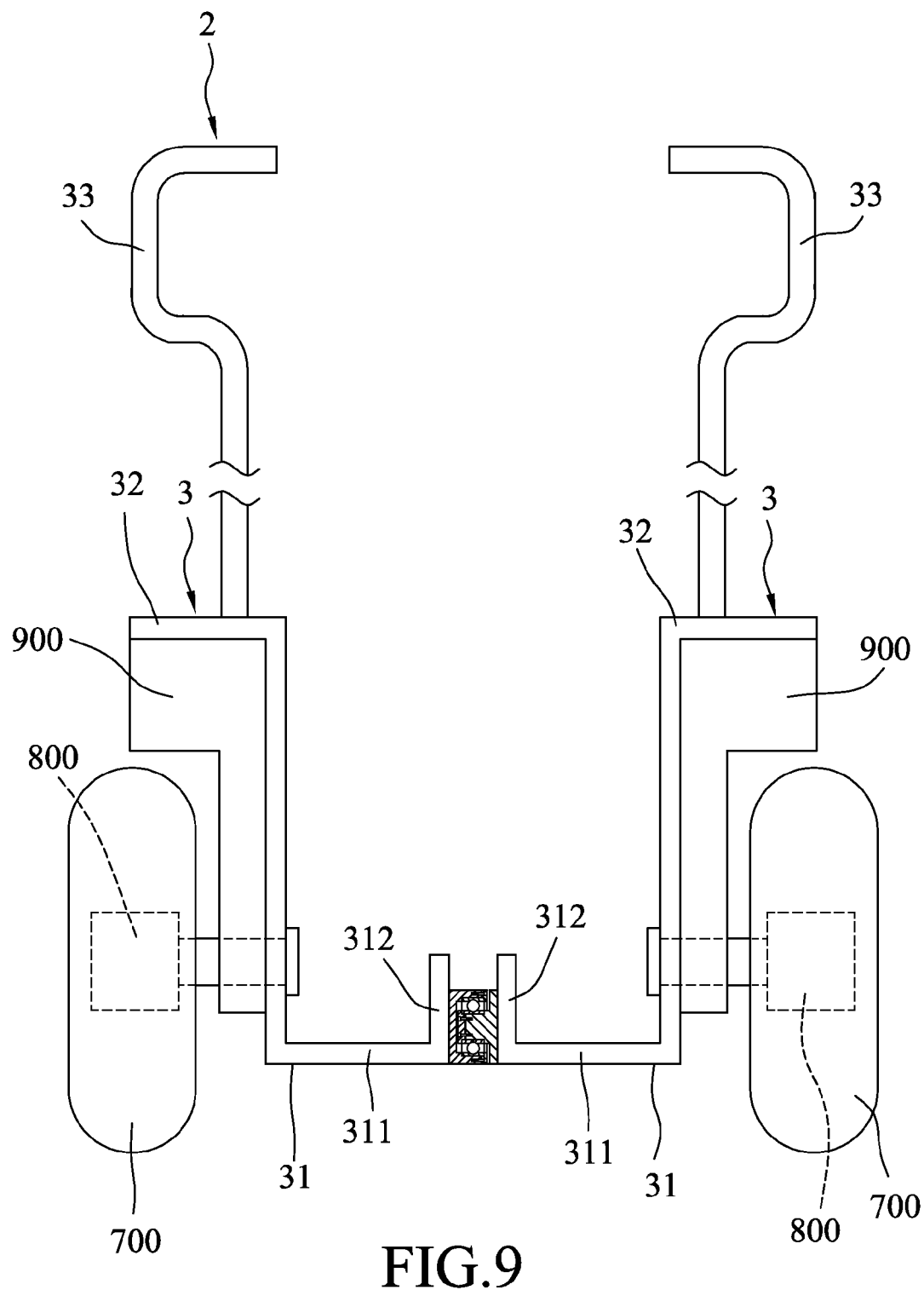
FIG. 9 is a front view of the second embodiment.

FIGS. 8 and 9 show the second embodiment of a self-balancing vehicle frame 2 according to this invention, which differs from the first embodiment in the structures of the side frame units 3.

In this embodiment, each side frame unit 3 includes a frame body portion 32, a pedal portion 31 extending from a bottom end of the frame body portion 32, and a handle portion 33 connected fixedly to the frame body portion 32. Each frame body portion 32 is adapted for mounting the corresponding wheel 700, the driver 800, and the corresponding self-balancing electrical system 900. Each pedal portion 31 has a foot supporting wall 311 extending horizontally from the corresponding frame body portion 32 toward the other of the side frame unit 3, and a stop wall 312 extending upwardly from a side of the foot supporting wall 311 distal from the corresponding frame body portion 32. The first and second pivot seats 41, 42 of the bearing unit 4 are connected respectively and fixedly to side surfaces of the stop walls 312 that face toward each other, and are interconnected by the bearing 43 such that each side frame unit 3 can tilt independently against the other of the side frame units 3, before being assembled into a complete vehicle and being in a subassembly condition.

The vehicle frame 2 of this embodiment can be operated in the same manner as the first embodiment.

Figure 10:
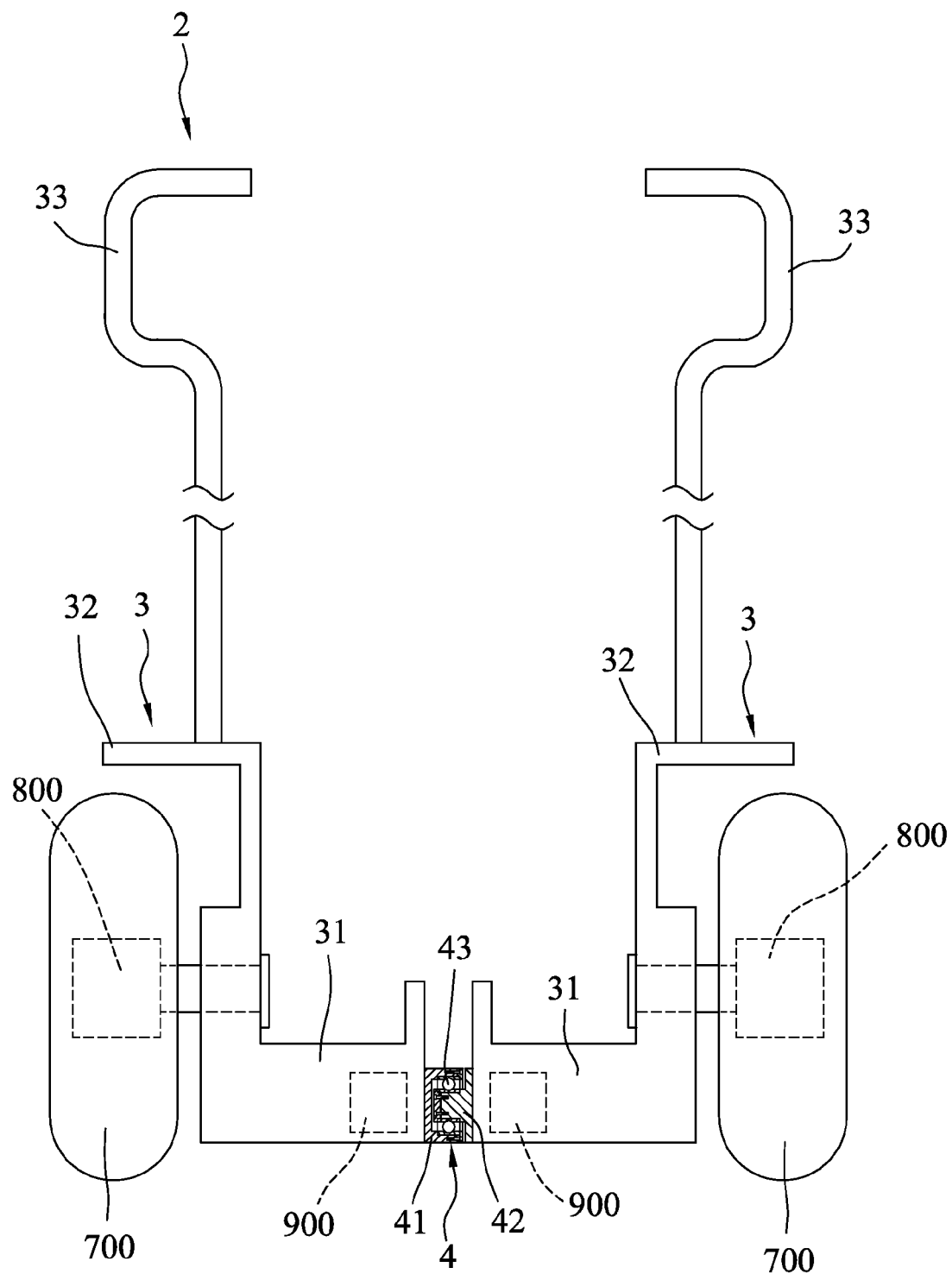
FIG. 10 is a view similar to FIG. 9, but illustrating an modification to the positions of two self-balancing electric systems.

With particular reference to FIG. 10, this embodiment can be modified such that, each pedal portion 31 is configured as a hollow box, and receives the corresponding self-balancing electrical system 900. Alternatively, the first and second pivot seats 41, 42 may be mounted respectively to bottom surfaces of the pedal portions 31. As such, each side frame unit 3 also can tilt independently against the other of the side frame units 3 before being assembled into a complete vehicle and while being in a subassembly condition.

Or, each side frame unit 3 can be mounted with one wheel 700, one driver 800, and one self-balancing electrical system 900 to form a single-wheeled self-balancing vehicle. That is, the side frame units 3 form parts of two single-wheeled self-balancing vehicles. The two sets of the above single-wheeled self-balancing vehicles can be interconnected by the bearing unit 4 to form a two-wheeled self-balancing vehicle, so that the side frame units 3 can be operated to allow the vehicle to turn and move forwardly or rearwardly.

Figure 11:
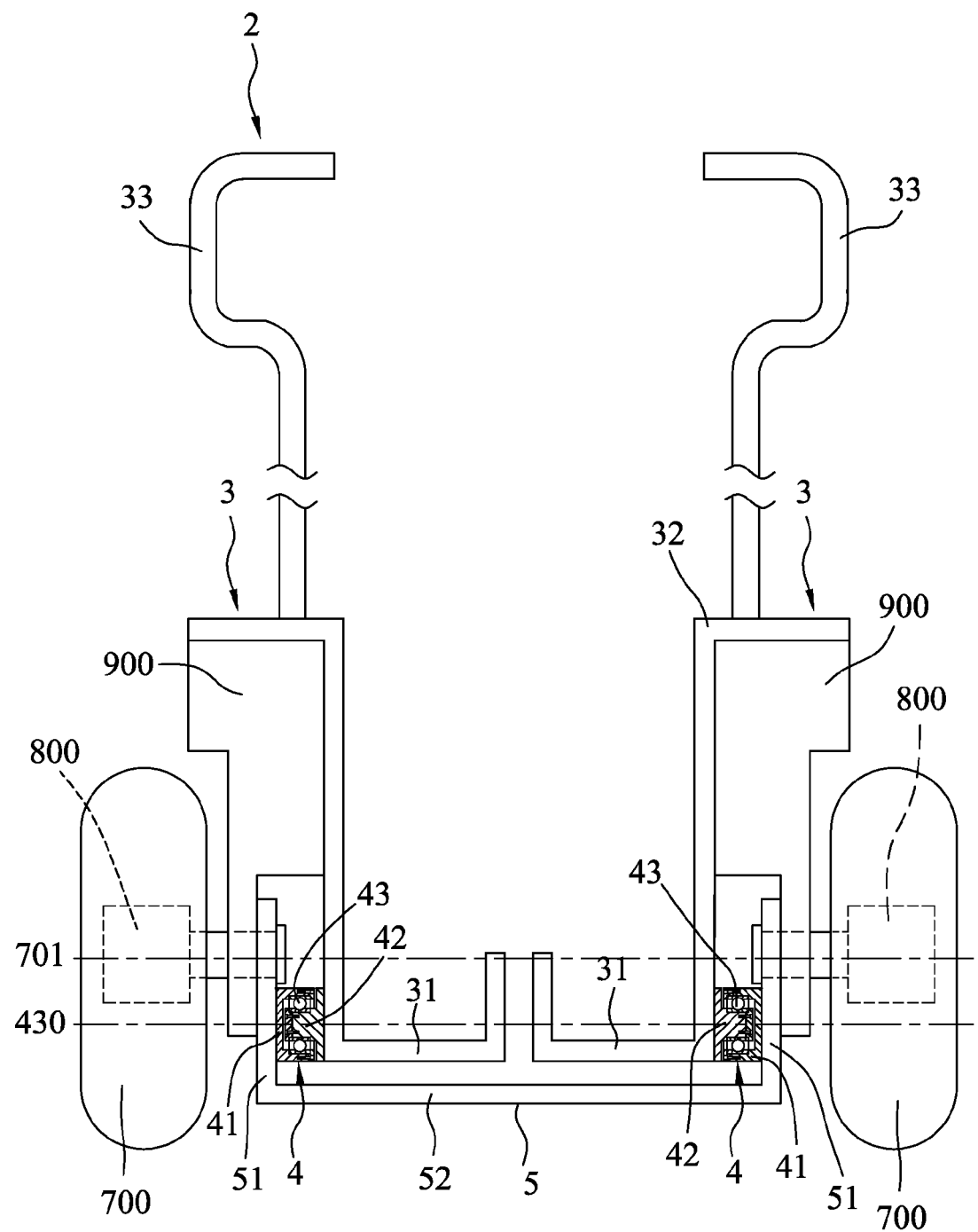
FIG. 11 is a front view of the third embodiment of a self-balancing vehicle frame according to this invention.

FIG. 11 shows the third embodiment of a self-balancing vehicle frame 2 according to this invention, which differs from the previous embodiments in that, the self-balancing vehicle frame 2 further includes a connecting frame unit 4.

The connecting frame unit 5 has: two pivot portions 51 disposed respectively at two opposite end portions thereof, aligned respectively with the side frame units 3, and configured respectively as parallel vertical plates; and a connecting portion 52 configured as a horizontal plate, extending under the side frame units 3 along the left-to-right direction, and connected between the pivot portions 51. The wheels 700 are connected respectively to the pivot portions 51 in such a manner that the pivot portions 51 are disposed between the wheels 700.

In this embodiment, each side frame unit 3 includes a vertical frame body portion 32, a pedal portion 31 extending from a bottom end of the frame body portion 32, and a handle portion 33 extending from a top end of the frame body portion 32.

The bearing unit 4 includes two first pivot seats 41 connected respectively and fixedly to the side frame units 3, two second pivot seats 42 connected respectively and fixedly to the pivot portions 51 of the end portions of the connecting frame unit 5 and permitting the first pivot seats 41 to be sleeved respectively and coaxially thereon, and two bearings each connected between a respective one of the first pivot seats 41 and a respective one of the second pivot seats 42. A common central axis 430 of the bearings 43 of the bearing units 4 is located below the rotating axes 701 of the wheels 700.

In an alternative embodiment, the pedal portions 31 of the side frame units 3 are modified into hollow box structures, and the self-balancing electrical systems 900 are disposed in the pedal portions 31.

Through cooperation among the side frame units 3, the connecting frame unit 5, and the bearing unit 4, each side frame unit 3 also can be tilted independently against the other of the side frame units by an angular displacement, which can be detected by the corresponding self-balancing electrical system 900 for controlling the vehicle to travel and turn. Consequently, the vehicle is convenient to operate using hands and/or feet.

Figure 12:
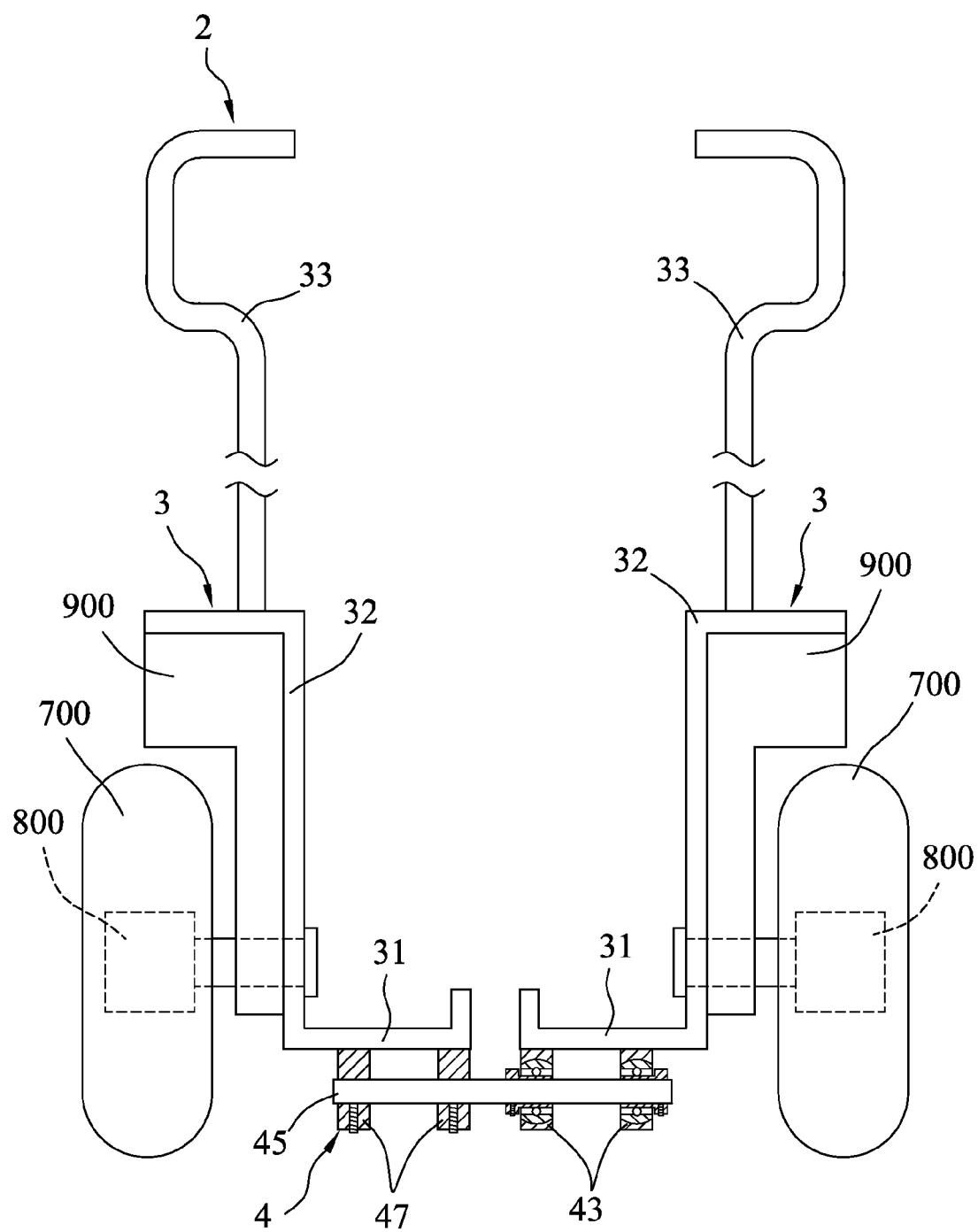
FIG. 12 is a front view of the fourth embodiment of a self-balancing vehicle frame according to this invention.

FIG. 12 shows the fourth embodiment of a self-balancing vehicle frame 2 according to this invention, which differs from the second embodiment in a structure for interconnecting the side frame units 3 and the bearing unit 4.

In this embodiment, the bearing unit 4 includes two bearings 43 spaced apart from each other along the left-to-right direction and disposed on a bottom surface of one of the pedal portions 31, two mounting seats 47 spaced apart from each other along the left-to-right direction and secured on a bottom surface of the other of the pedal portions 31, and a pivot shaft 45 extending through the mounting seats 47 and the bearings 43 and fixed within the mounting seats 47. The bearings 43 are, but not limited to pillow block bearing units.

As such, in this embodiment, through cooperation among the side frame units 3, each side frame unit 3 also can be tilted independently against the other of the side frame units 3.

Figure 13:
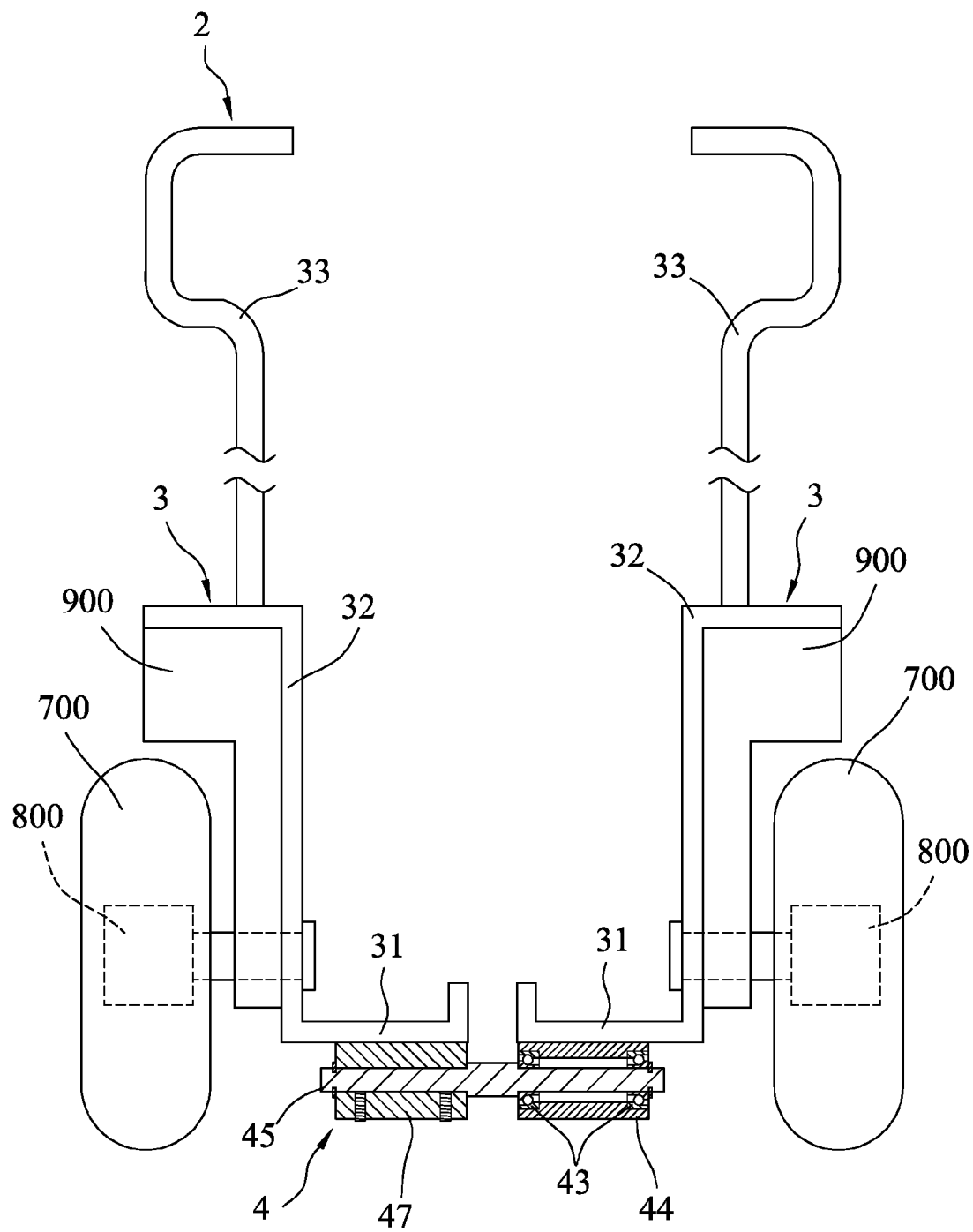
FIG. 13 is a front view of the fifth embodiment of a self-balancing vehicle frame according to this invention.

FIG. 13 shows the fifth embodiment of a self-balancing vehicle frame 2 according to this invention, which differs from the fourth embodiment in the bearing unit 4.

In this embodiment, the bearing unit 4 includes a tubular bearing seat 44 extending along the left-to-right direction and secured to a bottom surface of one of the pedal portions 31, a tubular mounting seat 37 extending along the left-to-right direction and secured to a bottom surface of the other of the pedal portions 31, a pivot shaft 45 extending through the mounting seats 47 and the bearing seat 44 and fixed within the mounting seat 47, and two bearings 43 disposed in the bearing seat 44 and permitting the pivot shaft 45 to extend therethrough. The bearings 43 are, but not limited to angular contact ball bearings.

As such, through cooperation among the side frame units 3, each of the side frame unit 3 also can be tilted independently against the other of the side frame units 3.

Figure 14:
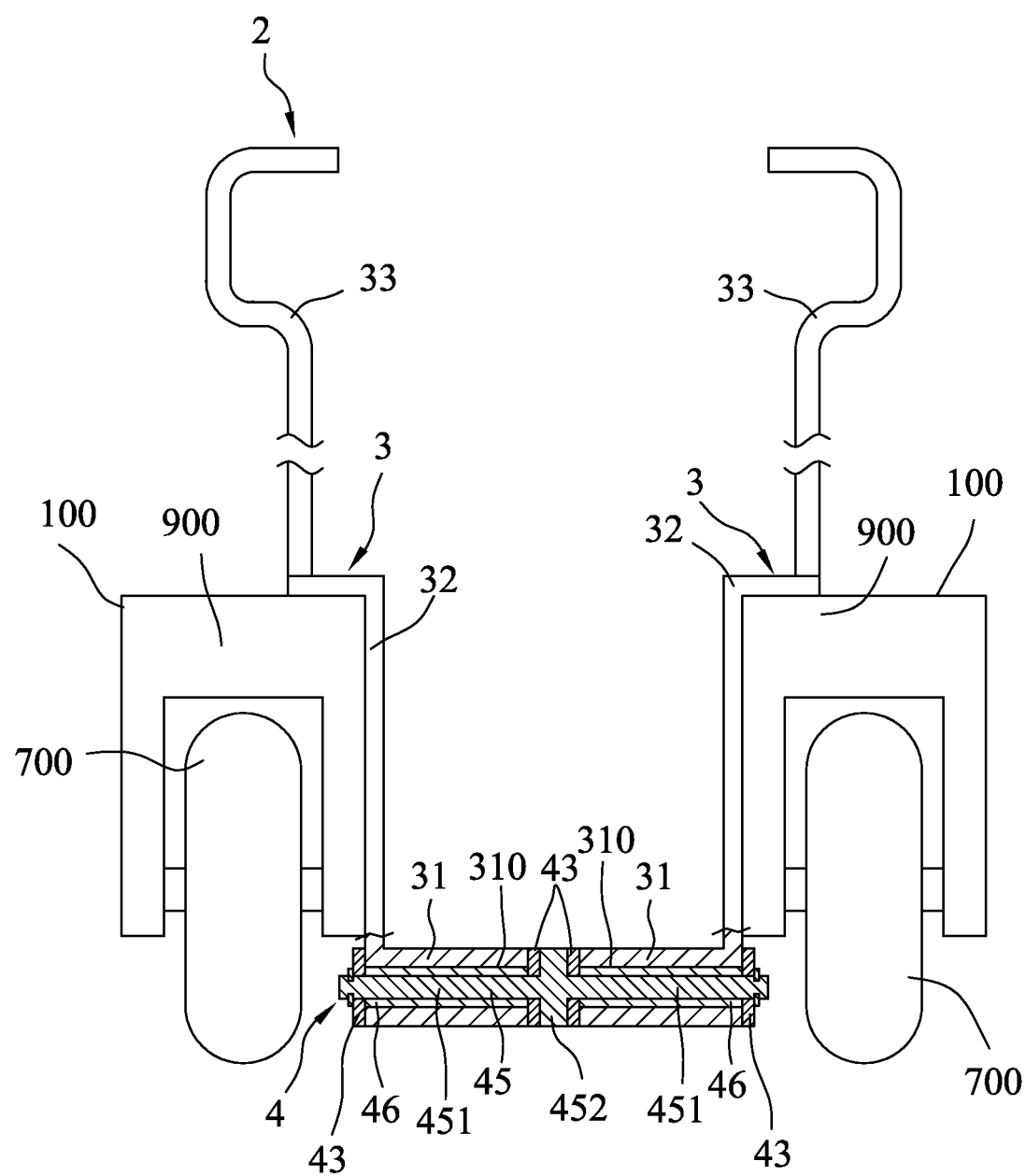
FIG. 14 is a front view of the sixth embodiment of a self-balancing vehicle frame according to this invention.

FIG. 14 shows the sixth embodiment of a self-balancing vehicle frame 2 according to this invention, which differs from the fourth embodiment in a structure for interconnecting side frame units 3 and the bearing unit 4.

In this embodiment, the side frame units 3 are adapted for mounting two single-wheeled self-balancing vehicles 100. Each single-wheeled self-balancing vehicle 100 includes a wheel 700 and a self-balancing electrical system 900.

The pedal portion 31 of each side frame unit 3 has a mounting hole 310 extending along the left-to-right direction. The bearing unit 4 including a pivot shaft 45 extending through the mounting holes 310 along the left-to-right direction, two lubricating bushings 46 disposed respectively in the mounting holes 310 and sleeved respectively on two end portions of the pivot shaft 45, and four bearings 43 disposed between the pedal portions 31 and the pivot shaft 45.

The pivot shaft 45 has two rod sections 451 extending respectively through the lubricating bushings 46, and a flange section 452 connected between the rod sections 451, having a diameter greater than those of the rod sections 451, and disposed between the pedal portions 31. Each rod section 452 is supported by two of the bearings 43. One of the two of the bearings 43 is disposed between the flange section 452 and one end of the corresponding pedal portion 31. The other of the two of the bearings 43 abuts against an end surface of the other end of the corresponding pedal portion 31. In this embodiment, the bearings 43 are, but not limited to plain thrust bearings.

As such, through cooperation among the side frame units 3, each of the side frame unit 3 also can be tilted independently against the other of the side frame units 3.

Figure 15:
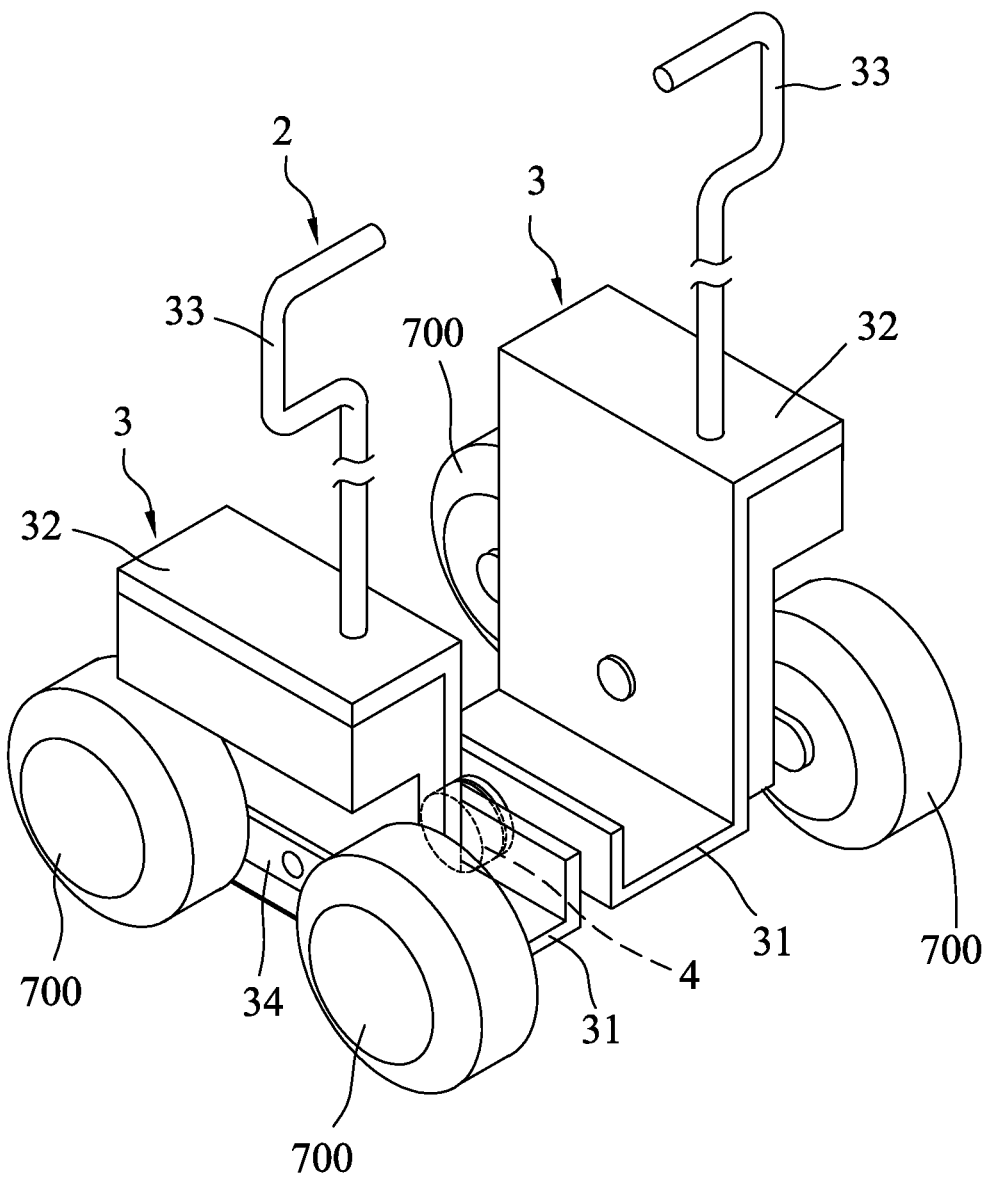
FIG. 15 is a perspective view of the seventh embodiment of a self-balancing vehicle frame according to this invention.
Figure 16:
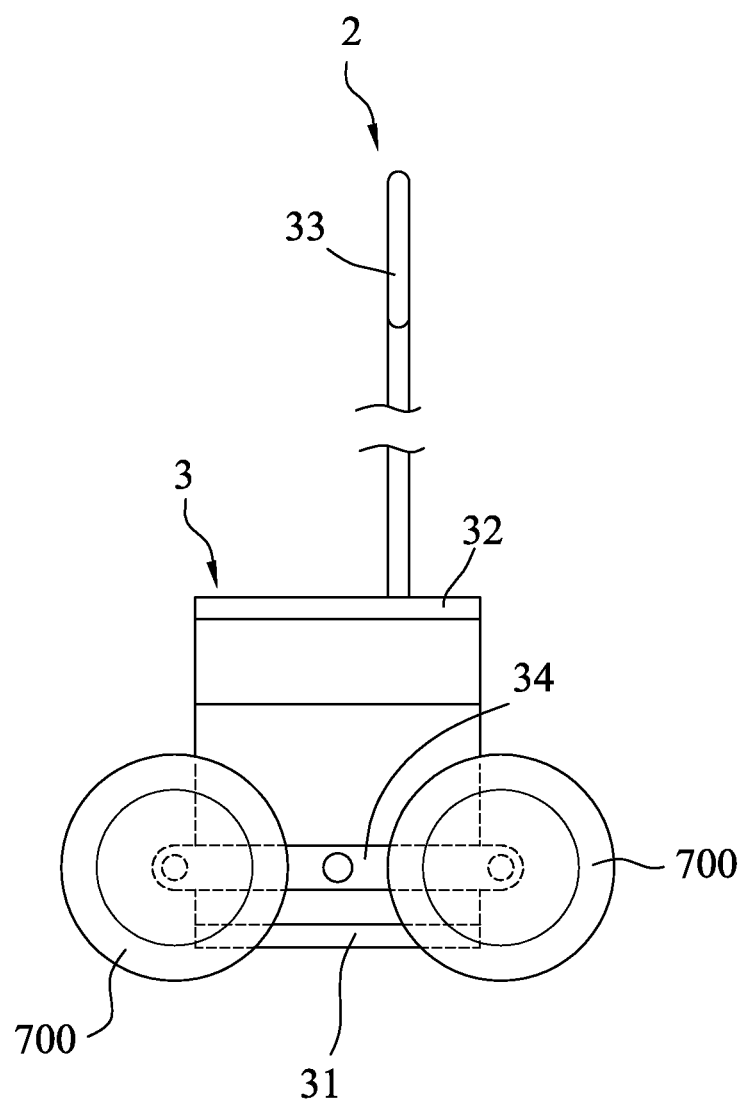
FIG. 16 is a side view of the seventh embodiment.
Figure 17:
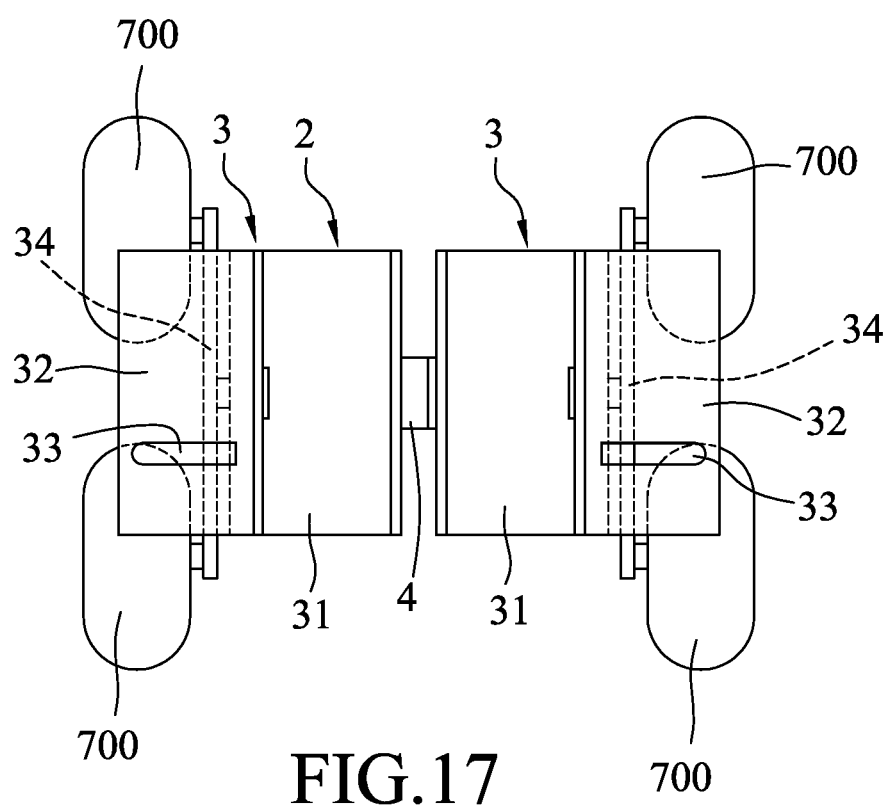
FIG. 17 is a top view of the seventh embodiment.

FIGS. 15, 16, and 17 show the seventh embodiment of a self-balancing vehicle frame 2 according to this invention, which differs from the second embodiment in the side frame units 3.

In this embodiment, the self-balancing vehicle frame 2 is adapted for mounting four wheels 700 to form a four-wheeled self-balancing vehicle. Each side frame unit 3 includes a frame body portion 32, a pedal portion 31 extending from a bottom end of the frame body portion 32, a handle portion 33 extending from a top end of the frame body portion 32, and a connecting frame 34 mounted to the frame body portion 32.

Each connecting frame 34 is configured as a rod, extends along a front-to-rear direction, and has an intermediate portion connected pivotally to a side of the corresponding frame body portion 32 distal from the other of the frame body portions 32. The connecting frames 34 are swingable forwardly and rearwardly relative to the corresponding frame body portion 32. The wheels 700 are mounted respectively to front and rear ends of the connecting frames 34.

As such, through cooperation among the side frame units, each of the side frame unit 3 also can be tilted independently against the other of the side frame units 3, and the side frame units 3 can be connected with four wheels 700 to form the four-wheeled self-balancing vehicle. It should be noted that, the four-wheeled self-balancing vehicle is more stable, and can be prevented from overturning.

In view of the above, due to design of the side frame units 3 and the bearing unit 4 of the first and second embodiments or design of the side frame units 3, the bearing unit 4, and the connecting frame unit 5 of the third embodiment, the vehicle frame 2 can be mounted with the wheels 700, the drivers 800, and the self-balancing electrical systems 900 to form a two-wheeled self-balancing vehicle. Or, the vehicle frame 2 can be used to interconnect two single-wheeled balancing vehicles to forma two-wheeled self-balancing vehicle. In this manner, the vehicle can be controlled to travel and turn by operating the handle portions 33 with the hands and/or operating the pedal portions 31 with the feet, thereby promoting the flexibility of control the vehicle. That is, the vehicle is convenient to operate. Thus, the object of this invention is achieved.

With this invention thus explained, it is apparent that numerous modifications and variations can be made without departing from the scope and spirit of this invention. It is therefore intended that this invention be limited only as indicated by the appended claims.

What is claimed is:

1. A self-balancing vehicle frame adapted to be mounted with at least two wheels and two self-balancing electrical systems for automatically controlling rotation of the wheels to maintain the wheels in a balanced state, said self-balancing vehicle frame comprising:

two side frame units, each of said side frame units being adapted to be mounted with a respective one of the wheels and a respective one of the self-balancing electrical systems and being operable to tilt forwardly and rearwardly for driving synchronously forward and rearward tilt of the respective one of the self-balancing electrical systems to turn the respective one of the wheels; and a bearing unit, before being assembled into a complete self balancing vehicle and while being in a subassembly condition, interconnecting said side frame units such that each of said side frame units can tilt independently against the other of said side frame units; and after said bearing unit is assembled into a complete self balancing vehicle and in working status, the rotating axis of said bearing unit being set around the rotating axis of wheels with an eccentricity.

2. The self-balancing vehicle frame as claimed in claim 1, wherein each of said side frame units having a pedal portion adapted to support a foot of a user and mounting a corresponding one of said self-balancing electrical systems, such that said pedal portion can be driven by the foot of the user to tilt forwardly and rearwardly the corresponding one of said self-balancing electrical systems, said bearing unit being connected between said pedal portions of said side frame units.

3. The self-balancing vehicle frame as claimed in claim 2, wherein each of said pedal portions being configured as a hollow box, and adapted to be mounted with a corresponding one of the wheels and a corresponding one of the self-balancing electrical systems.

4. The self-balancing vehicle frame as claimed in claim 2, wherein each of said side frame units further having a handle portion that is pushed forwardly and pulled rearwardly to drive a corresponding one of said self-balancing electric systems to tilt forwardly and rearwardly.

5. The self-balancing vehicle frame as claimed in claim 2, wherein said bearing unit including first and second pivot seats connected respectively and coaxially to each other, and a bearing connected between said first and second pivot seats such that each of said first and second pivot seats can tilt forwardly and rearwardly relative to the other of said first and second pivot seats.

6. The self-balancing vehicle frame as claimed in claim 5, wherein each of said side frame units further has a frame body portion, said pedal portion of each of said side frame units having a foot supporting wall extending from a bottom end of a corresponding one of said frame body portions and extending toward the other of said side frame unit, and a stop wall extending upwardly from a side of said foot supporting wall distal from said bottom end of the corresponding one of said frame body portions, said first and second pivot seats being mounted respectively on side surfaces of said stop walls of said side frame units that face toward each other.

7. The self-balancing vehicle frame as claimed in claim 2, wherein said bearing unit including a bearing seat secured to a bottom surface of one of said pedal portions, a mounting seat secured to a bottom surface of the other of said pedal portions, a pivot shaft extending through said mounting seat and said bearing seat along a left-to-right direction and fixed within said mounting seat, and at least one bearing disposed in said bearing seat and permitting said pivot shaft to extend therethrough.

8. The self-balancing vehicle frame as claimed in claim 7, wherein said mounting seat and said bearing seat being tubular, and extending along the left-to-right direction.

9. The self-balancing vehicle frame as claimed in claim 2, wherein said bearing unit including at least one bearing disposed on a bottom surface of one of said pedal portions, at least one mounting seat secured to a bottom surface of the other of said pedal portions, and a pivot shaft fixed in said mounting seat and extending through said bearing along the left-to-right direction.

10. The self-balancing vehicle frame as claimed in claim 2, wherein each of said pedal portions having a mounting hole extending along a left-to-right direction, said bearing unit including a pivot shaft extending through said mounting hole along the left-to-right direction, two lubricating bushings disposed respectively in said mounting holes in said pedal portions and sleeved on said pivot shaft, and four bearings disposed between said pivot shaft and said pedal portions, said pivot shaft having two rod sections extending respectively through said lubricating bushings, and a flange section connected between said rod sections, having a diameter greater than those of said rod sections, and disposed between said pedal portions, each of said rod sections being supported by two of said bearings, one of the two of said bearings being disposed between said flange section and one end of a corresponding one of said pedal portions, the other of the two of said bearings abutting against an end surface of the other end of the corresponding one of said pedal portions.

11. The self-balancing vehicle frame as claimed in claim 2, is adapted for mounting the four wheels, wherein each of said side frame units further includes a frame body portion and a connecting frame connected pivotally to said frame body portion, swingable forwardly and rearwardly, and adapted for mounting two corresponding ones of the wheels such that the two corresponding ones of the wheels are spaced apart from each other along a front-to-rear direction.

12. The self-balancing vehicle frame as claimed in claim 11, wherein said connecting frames configured as rods, and extend along the front-to-rear direction, each of said connecting frame having an intermediate portion connected pivotally to said frame body portion of a corresponding one of said side frame units, and front and rear ends that are adapted for mounting the two corresponding ones of the wheels.

* * * * *